US008396356B2

(12) United States Patent
Perry et al.

(10) Patent No.: US 8,396,356 B2
(45) Date of Patent: Mar. 12, 2013

(54) BATHING INSTALLATION HEATER ASSEMBLY

(75) Inventors: Loren R. Perry, Fountain Valley, CA (US); Paul Rosenau, Santa Ana, CA (US); Christopher P. Caronna, Trabuco Canyon, CA (US)

(73) Assignee: Balboa Water Group, Inc., Tustin, CA (US)

( * ) Notice: Subject to any disclaimer, the term of this patent is extended or adjusted under 35 U.S.C. 154(b) by 828 days.

(21) Appl. No.: 12/509,286

(22) Filed: Jul. 24, 2009

(65) Prior Publication Data

US 2011/0019983 A1 Jan. 27, 2011

(51) Int. Cl.
*A47J 31/00* (2006.01)
*F24H 1/10* (2006.01)

(52) U.S. Cl. ........................................ 392/465; 392/485

(58) Field of Classification Search .................. 392/465, 392/485

See application file for complete search history.

(56) References Cited

U.S. PATENT DOCUMENTS 4,924,069 A * 5/1990 Giordani ........................ 392/485
5,361,215 A 11/1994 Tompkins et al.
5,872,890 A * 2/1999 LaCombe ..................... 392/487
6,080,973 A 6/2000 Thweatt, Jr.
6,175,689 B1 * 1/2001 Blanco, Jr. .................... 392/485
6,282,370 B1 * 8/2001 Cline et al. .................... 392/465
6,295,980 B1 10/2001 Lopez et al.
6,591,063 B2 * 7/2003 Rochelle ....................... 392/485
6,629,021 B2 9/2003 Cline et al.
6,643,454 B1 * 11/2003 Rochelle ....................... 392/485
7,030,343 B2 4/2006 Tran
7,057,140 B2 6/2006 Pittman
7,822,326 B2 * 10/2010 Commette et al. ............ 392/484
8,104,434 B2 * 1/2012 Fabrizio .......................... 122/40
2006/0260036 A1 11/2006 Stover
2007/0058313 A1 3/2007 Maddox
2009/0132066 A1 5/2009 Hollaway

* cited by examiner

*Primary Examiner* — Thor Campbell

(74) *Attorney, Agent, or Firm* — Larry K. Roberts

(57) ABSTRACT

An exemplary embodiment of a heater assembly includes a heater housing structure defining an elongated heater chamber having a first port and a second port and defining a wetted side on the interior of the heater chamber and a non-wetted side on the exterior of the heater chamber. A resistive heater element is has an active region disposed within the heater chamber, free of any brazed or welded bulkhead members. The housing structure includes a first heater terminal opening and a second heater terminal opening, a first terminal end of the heater element passed through the first terminal opening from the wetted side to the non-wetted side, and a second terminal end of the heater element passed through the second terminal opening from the wetted side to the non-wetted side. First and second seal members are disposed on the non-wetted side respectively onto the first terminal end and the second terminal end and in contact with respective first and second seal surfaces defined on the housing structure. First and second fastener members respectively engage the first terminal end and the second terminal end and the first and second seal members. The housing structure may be fabricated of plastic, with respective current collectors in the form of unitary wire forms disposed at opposite ends of the housing structure.

36 Claims, 14 Drawing Sheets

FIG. 13A
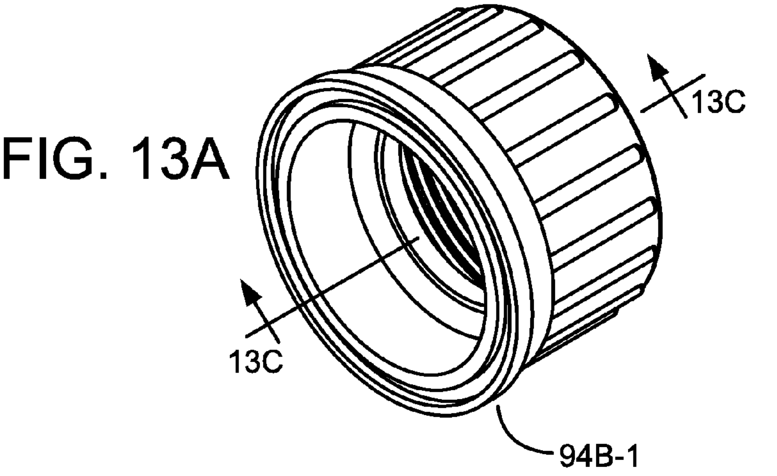
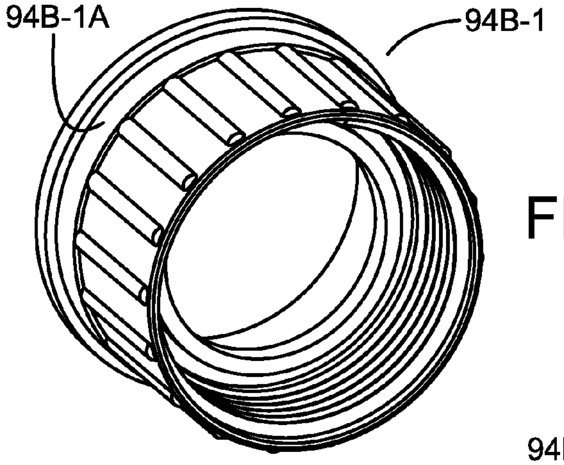
FIG. 13B
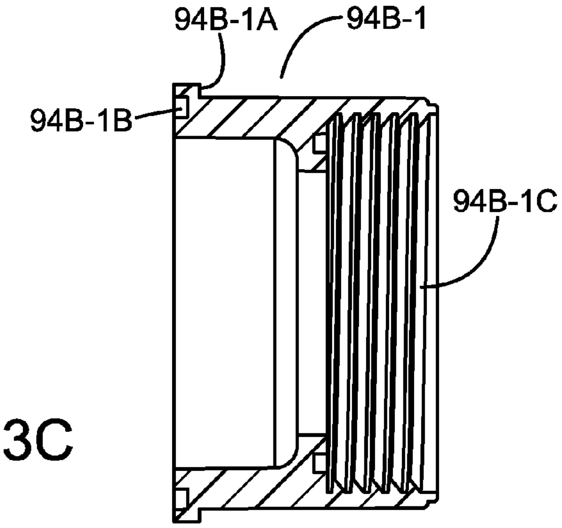
FIG. 13C

BATHING INSTALLATION HEATER ASSEMBLY

BACKGROUND

Bathing installations typically include a heater assembly connected in a recirculating water flow path, with a pump to circulate water through the heater and typically a filter. The heater assembly may include an electrically powered heater element, such as a resistive wire embedded within a heater rod immersed within a heater chamber. With the heater element exposed to the water flow, heater failures due to corrosion can occur.

Exemplary bathing systems with heaters and electronic controllers are disclosed in U.S. Pat. Nos. 6,282,370 and 7,030,343, the entire contents of which are incorporated herein by this reference.

BRIEF DESCRIPTION OF THE DRAWINGS

Features and advantages of the disclosure will readily be appreciated by persons skilled in the art from the following detailed description when read in conjunction with the drawing wherein:

FIGS. 13A, 13B, 13C and 13D illustrate features of an exemplary embodiment of a tailpiece adapter fitting for the heater assembly of FIG. 1.

DETAILED DESCRIPTION

Figure 1:
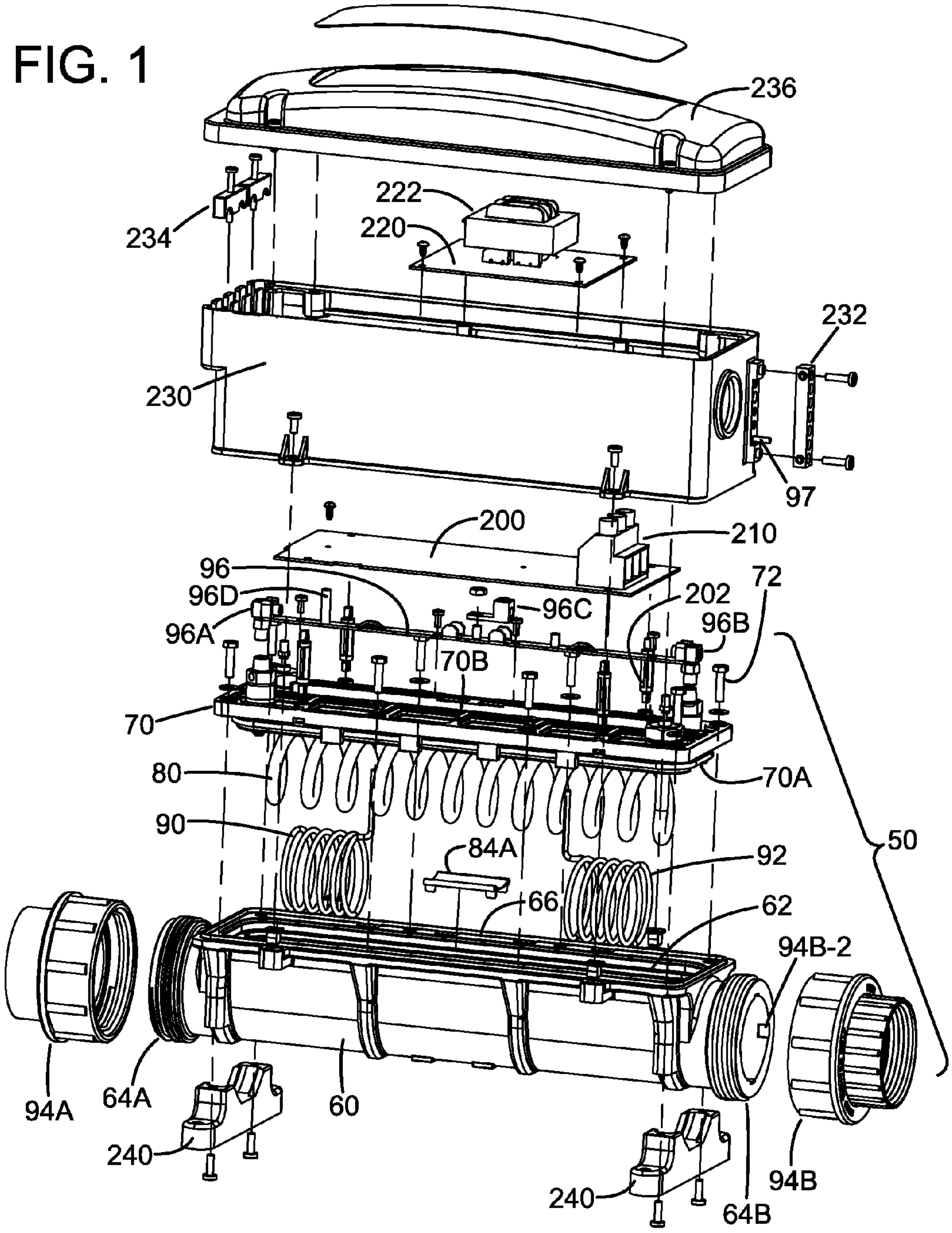
FIG. 1 is an exploded diagrammatic view of an exemplary embodiment of a heater assembly.

In the following detailed description and in the several figures of the drawing, like elements are identified with like reference numerals. The figures are not to scale, and relative feature sizes may be exaggerated for illustrative purposes.

Exemplary embodiments of a heater assembly may provide improved reliability over previously used heaters in the bathing installation field. A resistive heater element is mounted in a heater chamber within a housing structure, which may be fabricated of a plastic material, and its terminal ends passed through openings formed in the housing structure and sealed in place by use of seal members. In an exemplary embodiment, the heater element is fabricated without any brazed or welded bulkhead members. This eliminates a source of corrosion. The heater element may include a coil portion with a relatively low watt density characteristic, as compared to traditional, shorter, heating elements of the same power rating. In this regard, the watt density characteristic may be defined as the power (watts) divided by the effective heater element surface area (square inches). The ability to utilize a longer element section with the same power consumption translates into cooler operational temperatures and less stress on the heater element. Terminal ends of the heater element are passed through ports formed in the housing structure, and the pass through connection is sealed from a non-wetted side of the housing structure. Current collectors are also free of any brazed or welded bulkhead members, and terminal ends are passed through ports formed in the housing structure and sealed from a non-wetted side of the housing structure. Temperature sensors are mounted in ports in the housing assembly, in thermal communication with a heater chamber within the housing structure. In other embodiments, the heater housing structure may be fabricated from metal, or a combination of metal and plastic material.

Referring now to FIG. 1, an exemplary embodiment of a heater assembly 50 is illustrated in exploded isometric view. The heater assembly includes a housing assembly including housing 60, and a cover plate 70. The housing is a generally trough shaped elongated member defining an open trough region and having first and second opposed ends. The housing structure and cover plate define an elongated heater chamber 62, with a generally U-shaped cross-sectional configuration. First and second ports 64A, 64B are integrally formed respectively in the first and second ends of the housing and are threaded to attach to exemplary adapters 94, 96. The trough shaped member has an open top region circumscribed by a peripheral flange portion 66.

The cover plate 70 is configured for attachment to the peripheral flange portion of the housing and has a wetted surface 70A facing the trough region and a non-wetted surface 70B on an opposed side of the plate. The plate can be attached to the peripheral flange portion by threaded fasteners 72 received in threaded receptacles 63 in the flange portion of the housing. An o-ring seal 68 (FIG. 8) provides a fluid seal between the cover plate and the housing. The o-ring can be fabricated of silicone, for example.

In an exemplary embodiment, the housing 60 and cover plate 70 are fabricated, e.g., by injection molding, from a thermoplastic material selected to resist the high temperatures created by operation of the heater, and impervious to the water flowing through the heater assembly. One exemplary plastic suitable for a bathing installation application is polyphenolsulfide (PPS), one example of which is marketed as Ryton® polyphenylene sulfide (PPS) by Chevron Phillips Chemical Company. For other applications, the housing and/or cover plate may be fabricated of metal. The o-ring 68 may be fabricated of an elastomeric material, such as silicone rubber.

In an exemplary embodiment, a resistive heating element 80 is disposed within the heating chamber of the housing assembly, and includes an elongated coil portion 80A and opposed terminal end portions 82A and 82B. The heating element position within the heating chamber is fixed by a lower spring clip or bracket 84A and an upper spring clip or bracket 84B. The bracket 84A spaces the coil portion 80A from the bottom of the trough portion of the housing 70, and the upper bracket 84B provides a resilient spring force pressing the coil portion down and into contact with the bracket 84A when the cover plate is attached to the housing in an assembled condition. In an exemplary embodiment, the heating element may be rated at 4000 watts, have an axial length of about ten inches, a coil diameter of about 2 inches, and 12 coil turns. The heater element in an exemplary embodiment includes a resistive wire potted with a heat resistance dielectric potting compound, within an outer shield. The terminal end portions of the heater element are configured for connection to line voltage to drive the heater. The terminal ends may be threaded, for direct mechanical and electrical attachment to conductive pads on a controller circuit board 200 (FIG. 1), in an embodiment in which the controller board is integrated with the heater, as in FIG. 1, or to line voltage wiring in an embodiment in which the heater is located remotely from the controller system.

The use of a coil heater element provides greater heater element length for a given heater enclosure length. The coil heater element can be provided in different wattages, with different watt densities, to accommodate different application requirements. For example, a 5500 watt heater with a coil heater element may be provided with a watt density of 90.96 watts/sq. in. and a 1500 watt heater may be provided with a watt density of 20.71 watts/sq. in. In comparison, a commercially available 5500 watt heater with a conventional loop heater element has a watt density of 164.97 watts/sq. in. and a 1500 watt heater with a loop heater element has a watt density of 44.99 watts/sq. in. These higher watt densities are quite typical for the industry, though not universal. In other embodiment, the heater assembly may employ a loop-type heater element.

Figure 9:
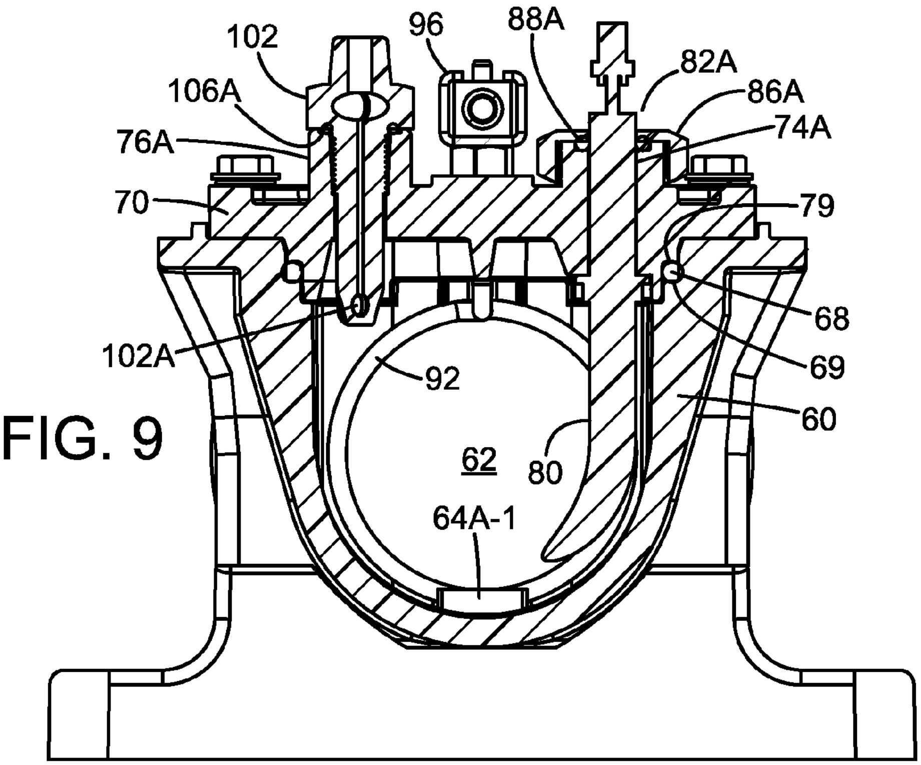

The terminal end portions of the heating element 80 are passed through respective openings or ports 74A and 74B formed in the cover plate 70 at opposite ends thereof, and on opposite sides of the longitudinal center line of the cover plate. FIG. 9 illustrates exemplary port 74A and terminal end portion 82A of the heater element. The ports include threaded bosses extending from the non-wetted surface of the plate. Seals are provided by o-rings 88A and 88B. The terminal end portions of the heating element extend through tube nuts 86A, 86B, which engage the threaded bosses, and compress the o-ring seals against the terminal ends of the heating elements.

The position of the heating element within the housing structure is fixed primarily by the spring clips 84A, 84B, which space the coil portion from the housing structure and the cover plate, so that the coil portion does not physically contact the housing structure. Brackets 85A, 85B may be crimped onto the heating element near the terminal ends to register the position of the terminal ends relative to the wetted surface of the plate 70. The brackets may be omitted for some embodiments. The brackets 85A and 85B may be made from stainless steel or other corrosion-resistant metal, such as the heater element sheath material, typically Incoloy® or titanium. There is some compressive force exerted on the terminal ends of the heating element by the o-rings and tube nuts as well. With the secure positioning of the heater element to reduce or eliminate vibration or rattles, the heater assembly can be used in high water flow rate applications, e.g. 250 gallons per minute or higher for some applications, as well as in lower flow rate applications.

In an exemplary embodiment, the heater assembly 50 may be provided with temperature sensors 102, 104 respectively positioned adjacent the heater ports 64A, 64B. The sensors are fitted into respective cover ports 76A, 76B, each of which includes a threaded boss. FIG. 9 illustrates exemplary sensor 76A, received in port 76A and secured by engagement of threads on the outer periphery of the sensor body with the threads formed in the port. A fluid seal is provided by an o-ring seal 106A. The exemplary sensor 102 includes a temperature sensing solid state device 102A, e.g. a thermistor, at its distal end within the heater chamber 62. An exemplary sensor suitable for the purpose is described in co-pending application Ser. No. 12/509,343, entitled OVERMOLDED TEMPERATURE SENSOR AND METHOD OF FABRICATING A SENSOR, the entire contents of which are incorporated herein by this reference.

Figure 10:
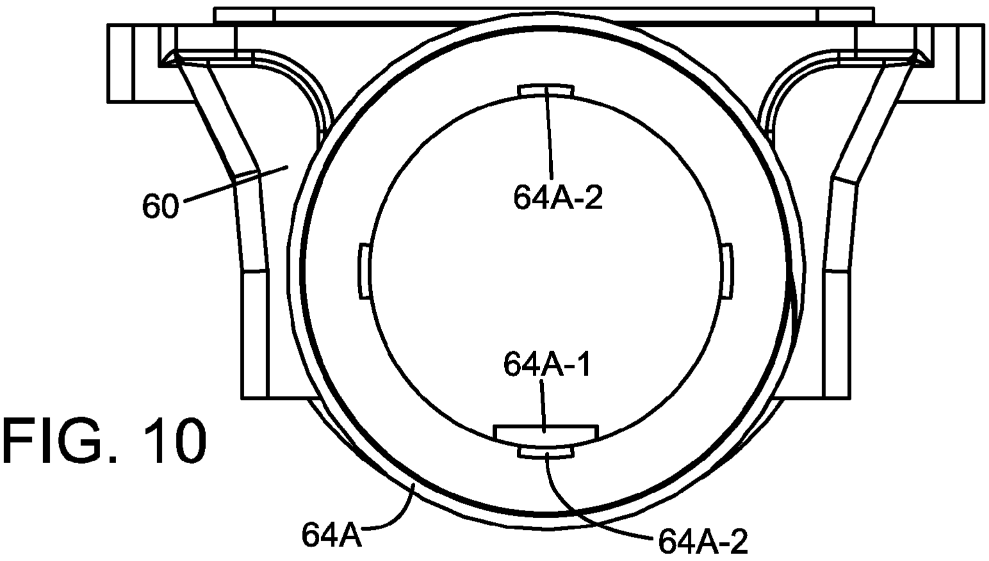
FIG. 10 is an end view of the housing structure of FIG. 3.
Figure 11:
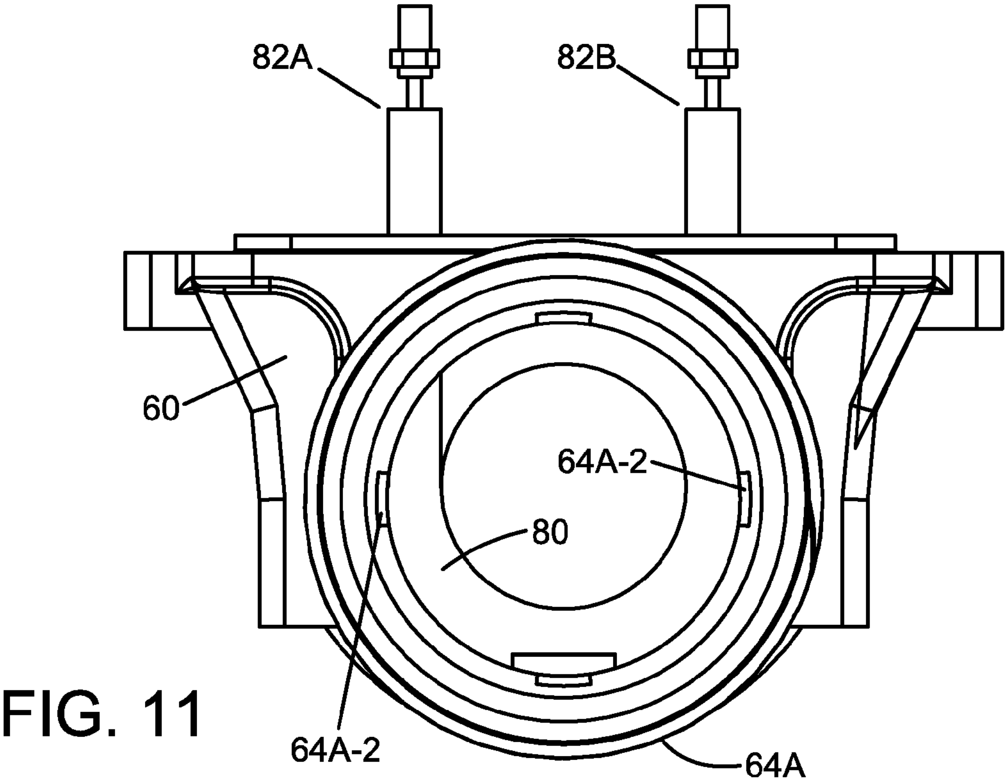
FIG. 11 is an end view of the heater assembly of FIG. 3, with the heater element in place.
Figure 12:
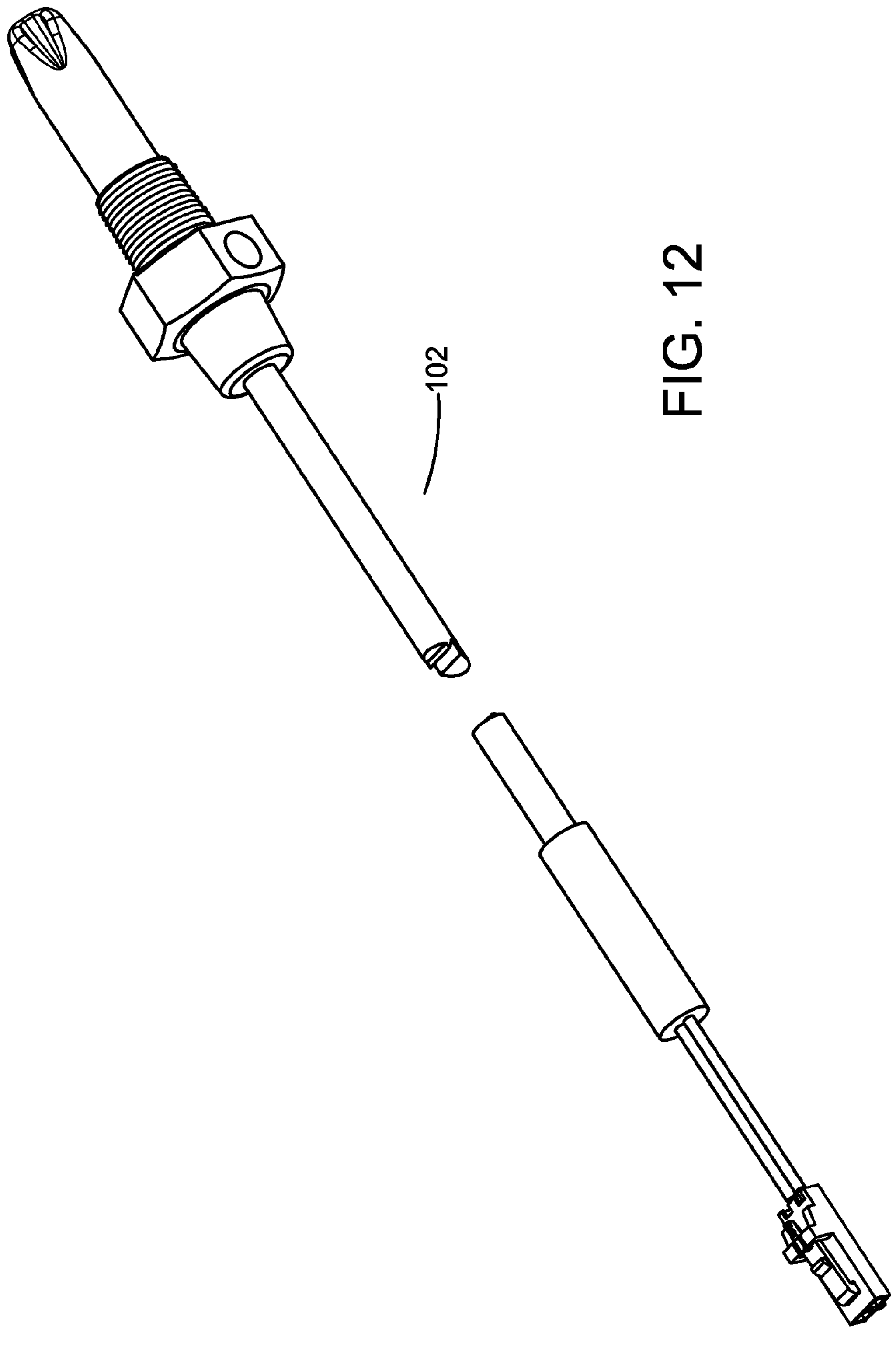
FIG. 12 is an isometric view of an exemplary embodiment of a temperature sensor mounted in the heater assembly of FIG. 1.

FIGS. 10 and 11 are end views of the housing structure 60, depicting features of the port 64A. The port includes four slots or relieved areas 64A-2, in this embodiment located at 90 degree spacing around the periphery of the port 64A. The slots provide radial position registration features for a tailpiece adapter, allowing the adapter to be fitted at four different predetermined radial or clock positions relative to the port, as will be described more fully below. Of course, the particular angular spacing may be varied to provide different radial positions.

Figure 2:
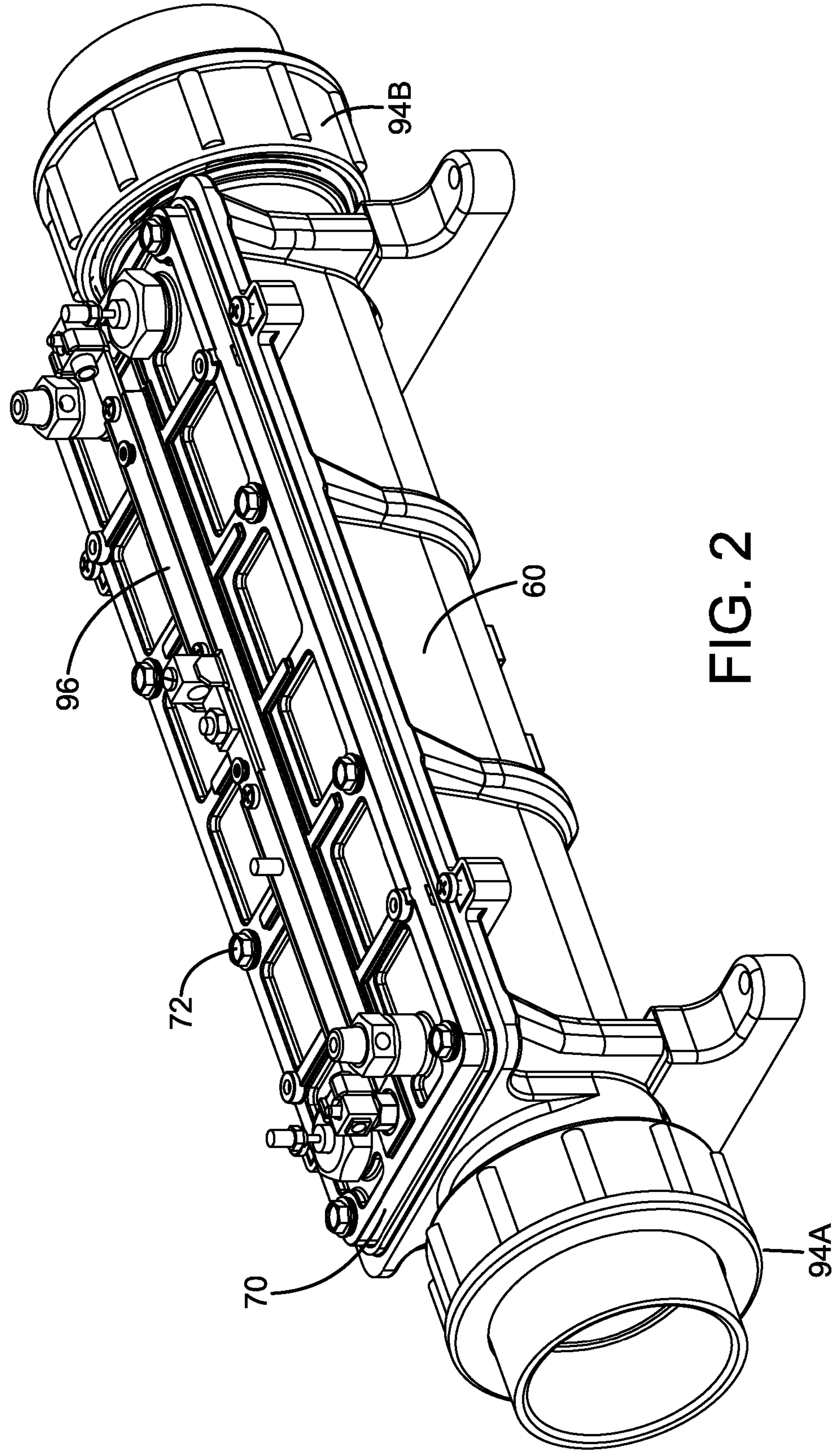
FIG. 2 is an isometric view of features of the heater assembly of FIG. 1, with the housing and cover plate assembled together, and exclusive of a cover and controller board.
Figure 2A:
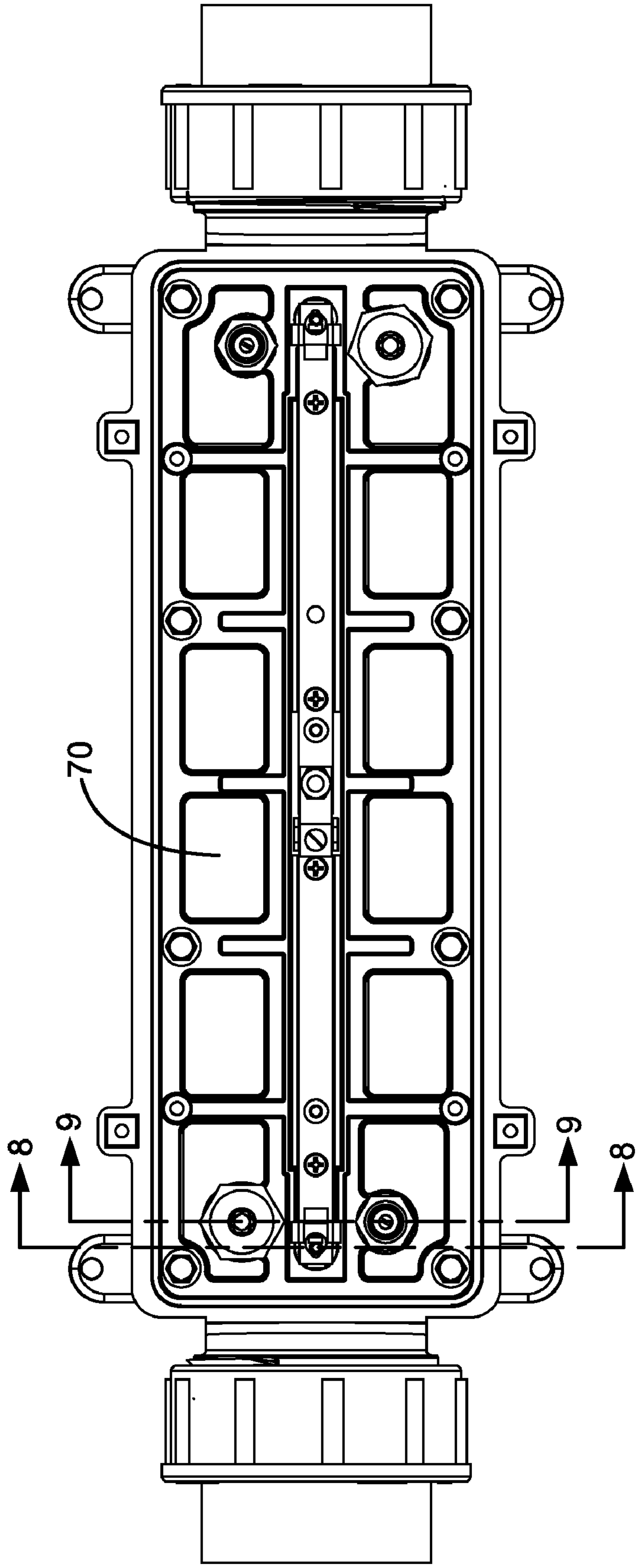
FIG. 2A is a top view of the heater assembly of FIG. 2.
Figure 3:
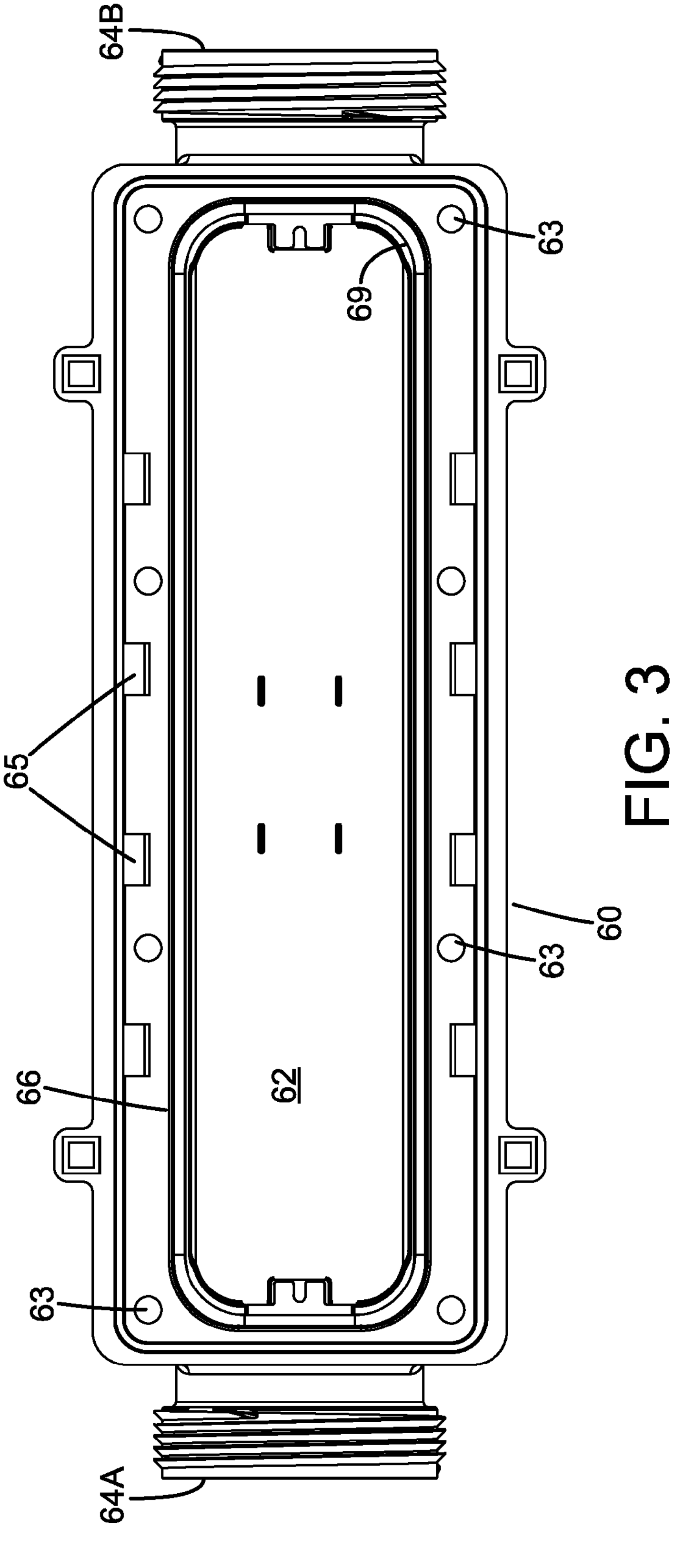
FIG. 3 is a top view of a heater housing structure for the heater assembly of FIG. 1.
Figure 4:
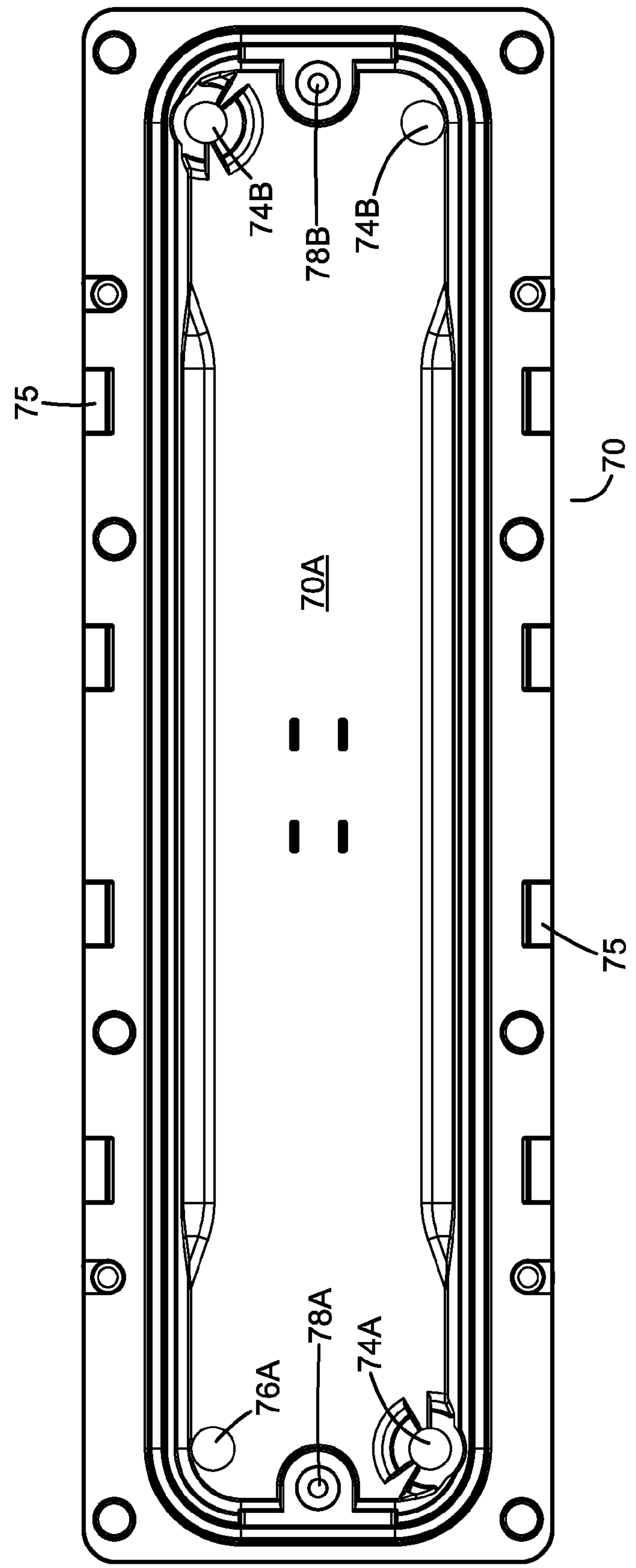
FIG. 4 is a bottom view of a cover plate for the heater assembly of FIG. 1.
Figure 5:
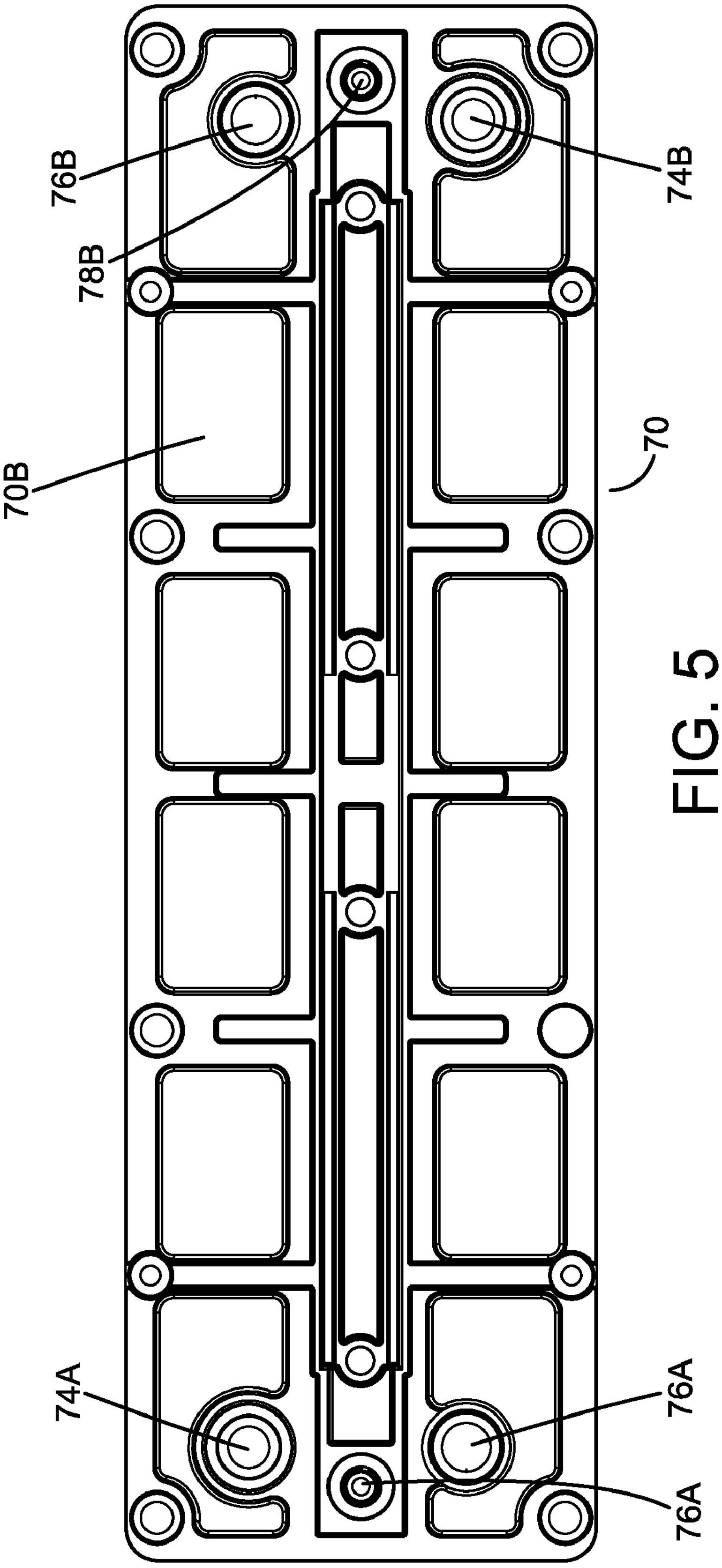
FIG. 5 is a top view of the cover plate of FIG. 4.
Figure 6:
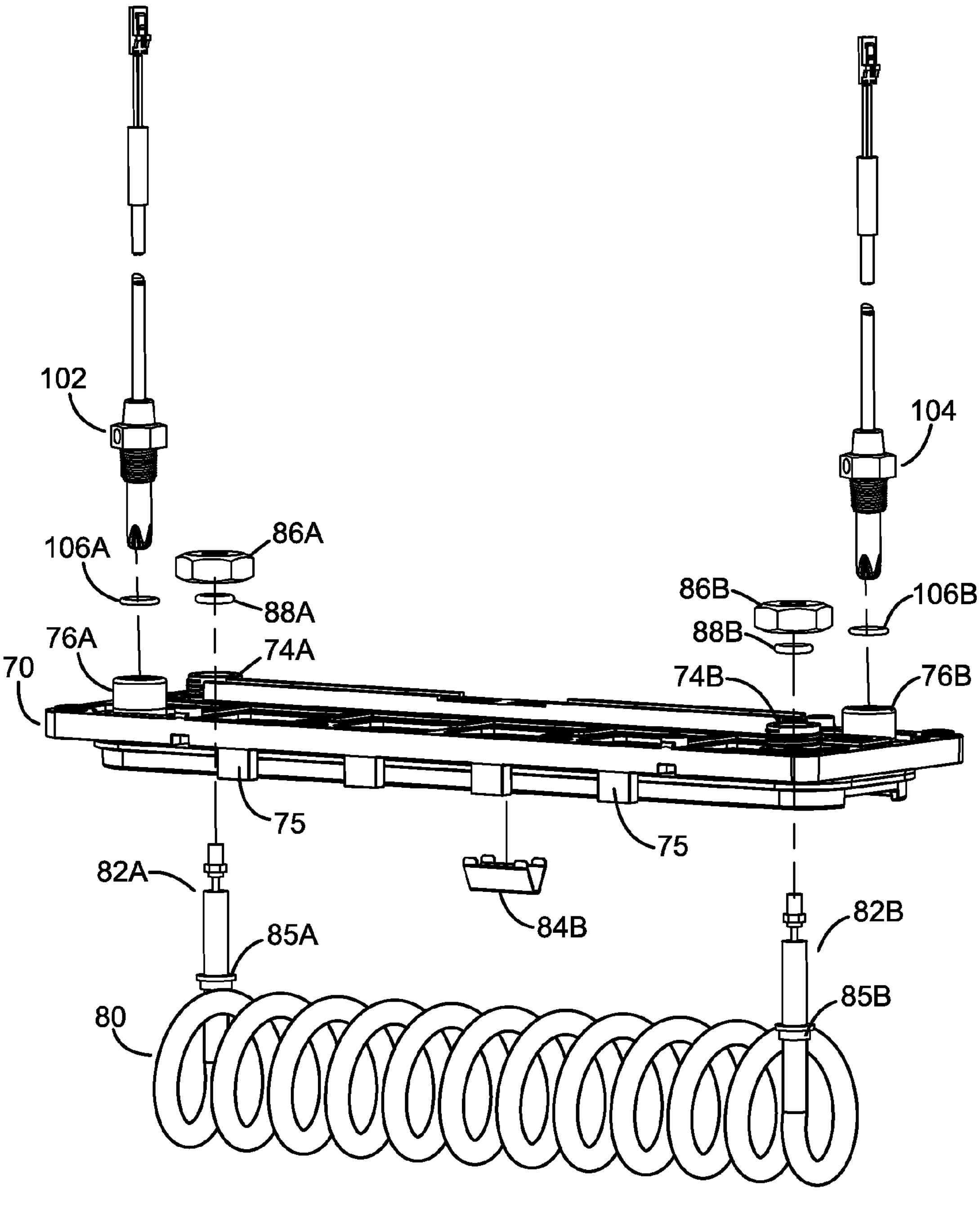
FIG. 6 is a partial exploded view of the heater assembly of FIG. 1, showing the heater element and temperature sensors.
Figure 7A:
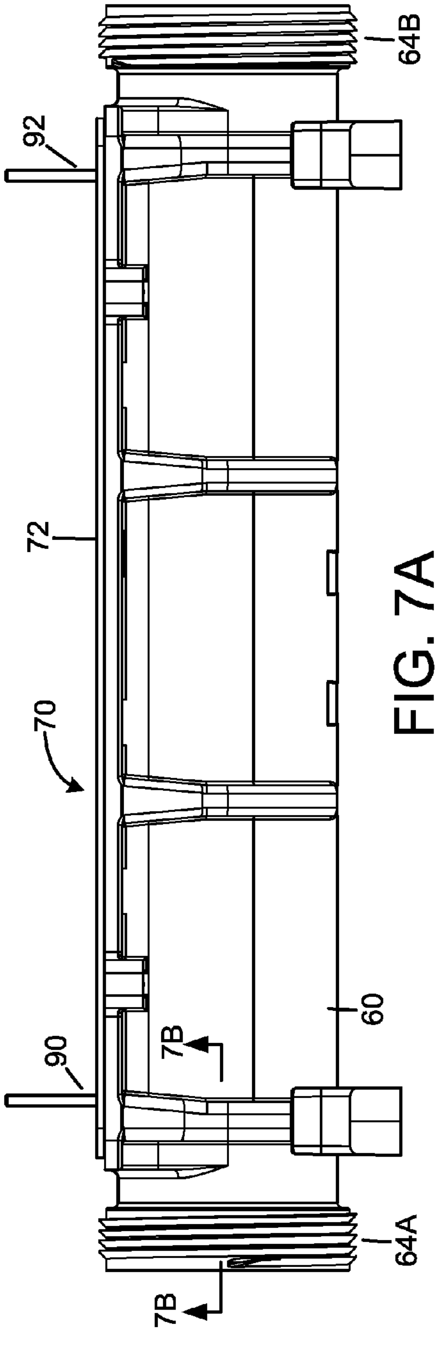
FIG. 7A is a side view of the housing structure of FIG. 2.
Figure 7C:
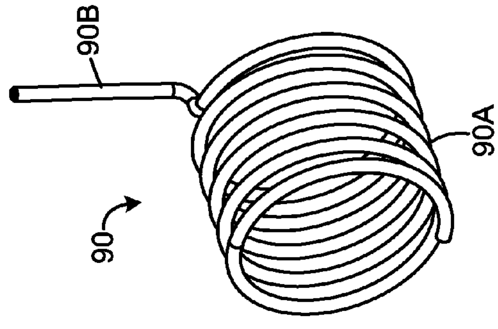
FIG. 7C is an isometric view illustrating one of the current collectors of the heater assembly of FIG. 1.

For the exemplary embodiment in which the heater housing is a plastic, electrically non-conductive structure, providing a stray current collector function is a issue. The stray currents may exist due to a failure in the heater element, for example, and may pass through conductive paths including the bathing installation water. A robust stray current collection capability is provided by current collector structures 90 and 92, illustrated in detail in FIGS. 7A, 7B and 7C. These current collector structures, in an exemplary embodiment, each are defined by unitary one-piece metal structures including a coil portion fitted within a heater port and a terminal portion which extends through a port in the cover plate. The exposed terminal ends of the terminal portion of the respective current collectors is connected to a ground conductor bar 96 (FIG. 2) which is connected to earth ground when the heater is installed in a bathing installation. In an exemplary embodiment, the current collector structures are fabricated from ⅛ (0.125) inch diameter stainless steel wire.

Figure 7B:
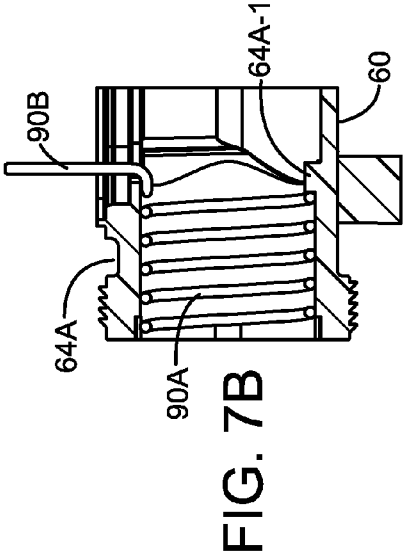
FIG. 7B is a partial cross-sectional view, taken along line 7B-7B of FIG. 7A.
Figure 8:
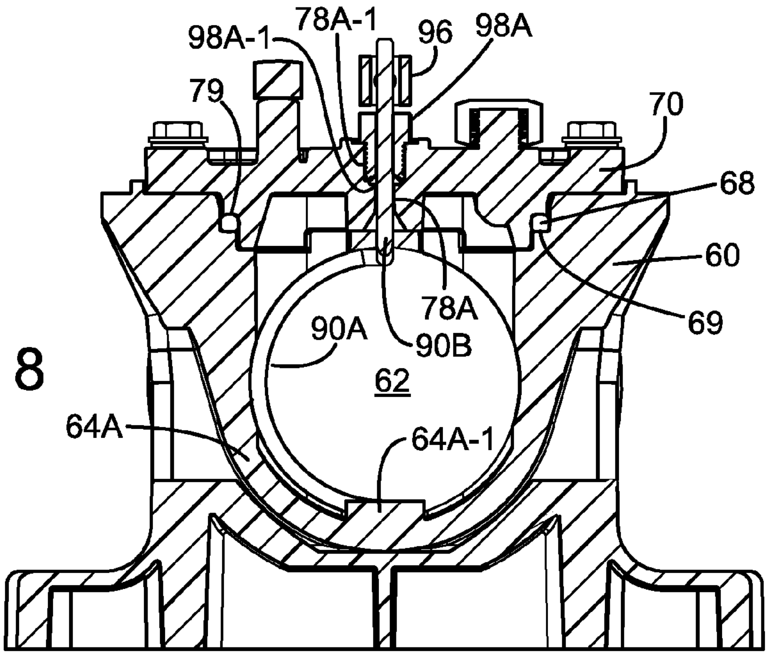
FIGS. 8 and 9 are respective cross-sectional views of the heater assembly of FIG. 2A, taken along lines 8-8 and 9-9.

In an exemplary embodiment, the heater ports 64A and 64B have generally tubular or cylindrical interior configurations, opening into the heater cavity 62. FIG. 7B illustrates port 64A, for example. The coil portions of the current collector structures 90, 92 have a nominal outer diameter which is slightly larger than the inner diameter of the heater ports. The coil portion of the collector may be fitted into the heater ports by pulling on the distal ends of the coil portions to temporarily compress the diameter of the coil portion, with the slight oversizing of the diameter tending to hold the coil portion in position in the port, even in the presence of high volume water flow through the heater. To provide a stop surface to prevent movement of the coil portion into the cavity 62 due to the force of water flow, a small protrusion or bump extends from the bottom of the port wall. FIGS. 7B and 8 illustrate an exemplary protrusion 64A-1 against which the coil portion 90A of collector 90 is positioned, with the terminal portion 90B of the current collector passed upwardly through a port 78A formed in the cover plate 70. The port 78A on the non-wetted surface of the plate has a threaded recess 78A-1, into which an o-ring seal 98A-1 is positioned. A tube nut 98A with the terminal portion 90B passed through its center opening engages the threaded recess and compresses the o-ring to provide a fluid seal on the non-wetted side of the cover plate. In an exemplary embodiment, the port 78A and the corresponding port (not visible in FIG. 8) for current collector 92 are formed along the longitudinal center line of the cover plate.

The grounding bar 96 includes pressure connectors 96A, 96B at each end to receive the exposed ends of the current collector terminal portions, and make electrical connection to the current collectors. In an exemplary embodiment, the grounding bar 96 is connected to a bond lug of terminal block 232 on the outside of the plastic enclosure 230 via a solid copper wire 97 (FIG. 1) that is routed from the ground connector 96C on the grounding bar, under the circuit board 200, through a hole in the plastic enclosure 230 and into the ground terminal block 232. A metal boss 96D protrudes from the grounding bar 96 upwardly, and is connected to a ground pad on the circuit board 200 to provide a ground for the circuit board.

In an exemplary embodiment, the current collector system does not have any wetted connections that would be subject to corrosion. This provides enhanced reliability of the heater system.

A further advantage of the heater system is that the heater system can be installed in a water flow path in either direction. Thus, port 64A can be on the inlet side, or on the outlet side, providing flexibility to the bathing installation designer. The flexibility is a result of the use of temperature sensors adjacent each port, the current collectors at each port, and the secure positioning of the heater element within the heater chamber, reducing or eliminating vibration of the heater element due to the volume of water pumped through the heater.

Exemplary embodiments of the heater system may be disassembled and serviced in the field. This provides a significant advantage over conventional systems which are sealed, e.g. by adhesive or potting material, and can only be replaced in the event of a malfunction.

In an exemplary embodiment, the cover plate 70 is mounted to the housing 60 by threaded fasteners 72 which are received in threaded receptacles in the flange region of the housing. A fluid seal between the housing and the cover plate is provided by an o-ring 68 (FIGS. 8 and 9) positioned at a peripheral shoulder or raceway 69 formed in the flange region of the housing. The cover plate 70 has a corresponding peripheral shoulder or raceway 79. As the cover plate is positioned on the housing, the shoulder 79 exerts a radial seal force on the o-ring 68, comprising the o-ring between the shoulders 69 and 79. To further strengthen the assembly of the cover plate to the housing, tabs 75 (FIG. 1) extending downwardly from the periphery of the longitudinal sides of the cover plate enter corresponding slots 65 formed in the periphery of the flange portion of the housing 60. The tab and slot features work together to maintain proper relationship of the o-ring 68 relative to the cover 70 and housing 60. The tabs 75, with their engagement in the slots 65, will not allow the long flat surfaces of the housing to be pressed outwardly to the point that the o-ring is not properly compressed, causing the seal to leak.

Since the cover plate seals for the heater element terminal end portions, the current collector terminals and the temperature sensors are all secured by removable, threaded fasteners, these fasteners may be removed in the field, the fasteners 72 removed, and the cover plate removed from the housing. The heater element, temperature sensors and the current collectors may be removed if needed from the housing for service or replacement. The various seals can also be replaced as needed.

Figure 16:
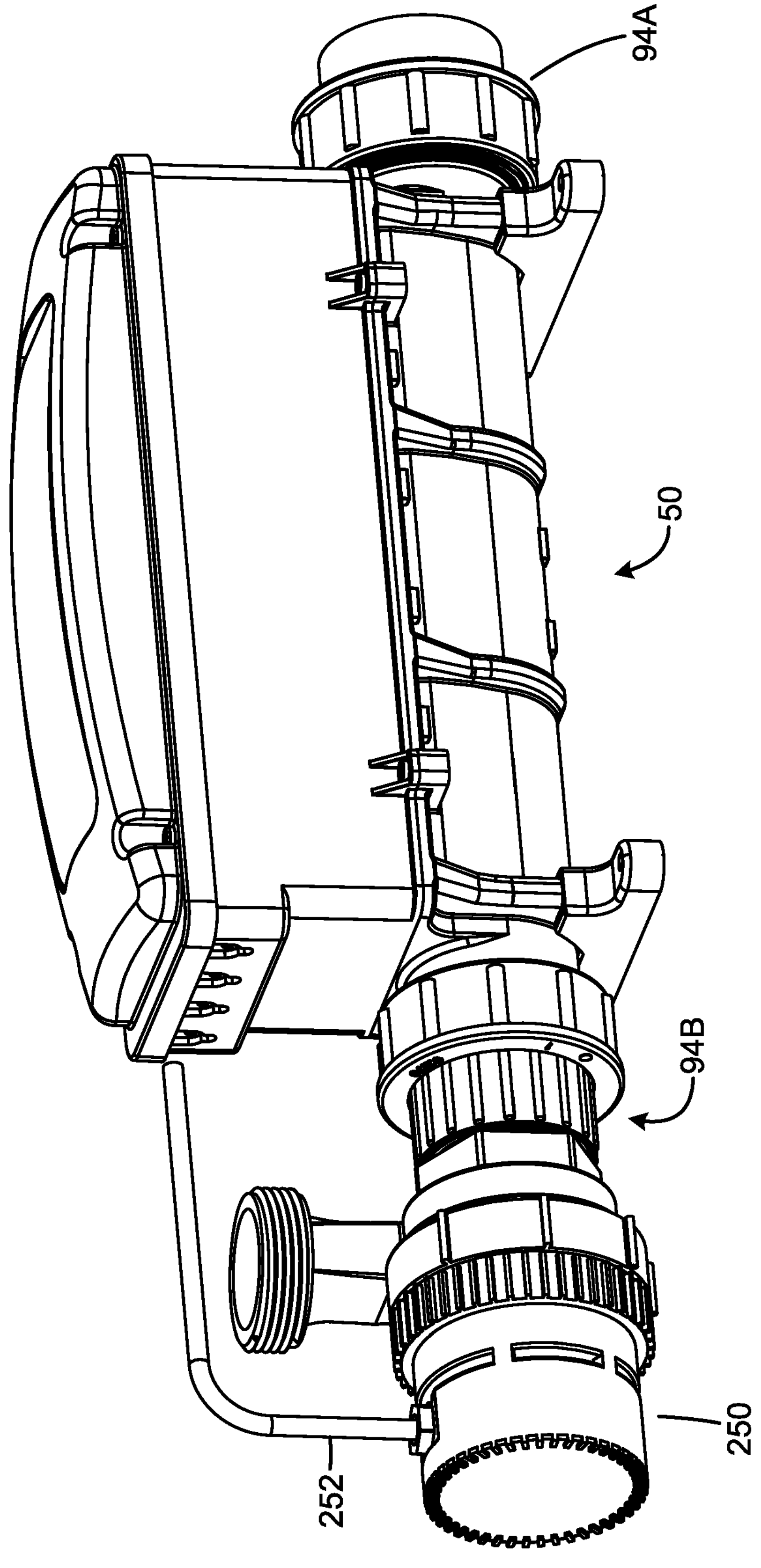
FIG. 16 is an isometric view of a heater assembly as in FIG. 1 directly connected to a pump.

As noted above, the heater assembly 50 can be configured for use in an embodiment in which the bathing installation controller is co-located with the heater, as illustrated in FIG. 1 and FIG. 16. In this embodiment, a controller printed circuit board 200 has a microcomputer mounted thereon, with printed wiring circuit traces, relays, switches and other circuit elements. The circuit board is spaced above the cover plate 70 by spacers 202. An auxiliary circuit board 220 is in turn mounted above the controller circuit board by spacers, and has a voltage transformer 222 mounted thereon to transform AC line voltage into low voltage power. The top housing 230 is secured to the housing structure 60 by threaded fasteners, and a cover 236 is removably attached to the top housing by threaded fasteners as well. The ground terminal block 232 is mounted to one end surface of the top housing, and wiring to controlled devices such as a pump, lighting, blowers and the like can be secured by wiring clamp 234 at the opposite end surface of the top housing. Line voltage wiring is attached to line voltage connector 210 by pressure connectors.

In an embodiment configured for location remote from the controller, the top housing can be reduced in height, since the circuit boards would not be needed. Line voltage wiring can be directed connected to the heater element terminal ends, or to a line voltage connector block.

The tailpiece adapter 94B (FIGS. 1 and 13A-13D)) can be employed to connect the heater assembly 50 to a threaded fitting, e.g. on another device in the bathing installation recirculating flow path, and perform a male thread to female thread conversion. For example, the tailpiece adapter 94B may be employed to directly connect to a pump such as a circulation pump 250, as illustrated in FIG. 16. The electrical supply wiring 252 for the pump may be connected to a connector on the controller circuit board 200, through a relay or triac switch mounted on the board 200 to line voltage. The direct connection of the pump reduces the installation time and cost, since intermediate piping is not needed, and also reduces the space utilized by the heater and the pump. The available space is typically limited in a bathing installation such as a spa.

Figure 13D:
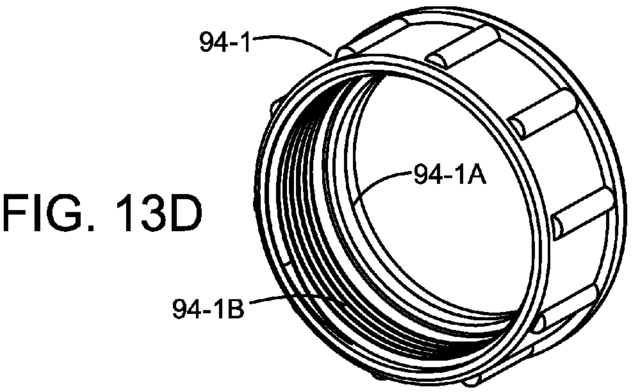
Figure 14:
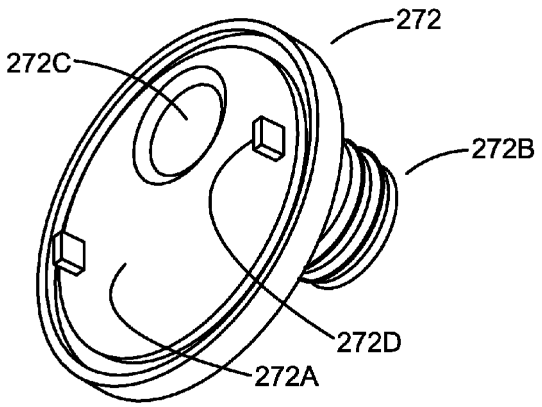
FIG. 14 is an isometric view of another embodiment of a tailpiece adapter structure.

The tailpiece adapter 94B is shown in detail in FIGS. 13A-13D, and includes a threaded nut 94-1 (FIG. 13D) and an adapter 94B-1 (FIGS. 13A-13C). The nut has an inner flange portion 94-1A at one end, and an interior threaded portion 94-1B at the opposite end. The threaded portion is configured to engage the threads on the housing port 64B, and the flange portion captures the corresponding outer flange portion 94B-1A on the adapter 94B-1. As the nut is tightened on the threads of the port 64B, the adapter is brought into sealing engagement with the port end surface, and an o-ring captured in groove 94B-1B of the adapter provides a liquid seal. The distal end of the adapter from the flange portion is provided with interior threads 94B-1C to engage with threads on the pump 250 to make the connection between the heater assembly 50 and the pump.

Figure 15:
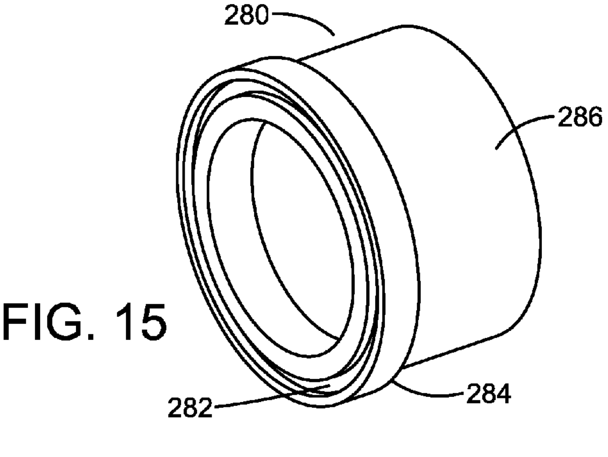
FIG. 15 shows a fitting which can secured to a heater port by the nut of the tailpiece adapter structure.

The tailpiece adapter set 94A may be connected directly to a rigid pipe or a pipe fitting by adhesive connection, for example. The tailpiece adapter set 94A is illustrated in FIGS. 13D and 1. The set includes a threaded nut such as the nut 94-1 (FIG. 13D), and a fitting 286 (FIG. 15) which can be secured to the heater port such as port 64A by the nut 94-1.

The fitting 272 includes a cover plate surface 272A for covering a portion of the port opening 64B, for example, with a tubular barbed port portion 272B extending from the surface about opening 272C. The fitting performs a size reducing function in this embodiment, say from a 2 inch port opening size for the port, to a one inch diameter tube size. This fitting may be used to connect the heater to a flexible tubing, for example, to a 1 inch diameter tube size. An o-ring groove 272E accepts a o-ring seal. The fitting 272 may be connected to the port opening by a nut 94-1.

The fitting 272 further includes registration tabs 272D, which are spaced to enter the slots formed in the ports, e.g. slots 64A-2 (FIG. 10) in housing port 64A. This allows the fitting 272 to be positioned at any one of four radial positions relative to the housing 60, determined by the slots in the ports. This provides flexibility to the installer to best position the tubular portion to connect to the flow path tubing. Further, this "clocking" feature allows the flexibility to position the port 272B at the highest elevation (of the four possible clock positions), whether the heater assembly is mounted with the mount struts 240 secured to either a horizontal surface or to a vertical surface, with the linear axis of the heater assembly disposed along the horizontal. This positioning of the port 272B tends to prevent air from being trapped in the cavity, which can lead to problems in pump operation. When the pump is not operating, any air in the cavity can drift out the port 272B.

Although the foregoing has been a description and illustration of specific embodiments of the subject matter, various modifications and changes thereto can be made by persons skilled in the art without departing from the scope and spirit of the invention as defined by the following claims.

What is claimed is:

1. A heater assembly for a bathing installation including a water flow path and a pump for pumping water through the water flow path, comprising:

a heater housing structure defining an elongated heater chamber having a first port and a second port and defining a wetted side on the interior of the heater chamber and a non-wetted side on the exterior of the heater chamber, the heater housing structure comprising an elongated member defining an open trough region, the trough shaped member having an open top region circumscribed by a peripheral flange portion, a cover plate configured for attached to said peripheral flange portion and having a wetted surface facing the trough region and a non-wetted surface on an opposed side of the plate, a seal member for providing a liquid seal between the cover plate and the flange portion, wherein the elongated member and the cover plate are fabricated of a plastic, non-electrically conductive material;

a resistive heater element, including a coil portion having a diameter smaller than an inner dimension of the heater chamber and a first terminal end and a second terminal end, the heater element being free of any brazed or welded bulkhead members;

the housing structure including a first heater terminal opening and a second heater terminal opening, the first terminal end of the heater element passed through the first terminal opening from the wetted side to the non-wetted side, and the second terminal end of the heater element passed through the second terminal opening from the wetted side to the non-wetted side;

first and second seal members disposed on said non-wetted side respectively onto the first terminal end and the second terminal end and in contact with respective first and second seal surfaces defined on the housing structure;

first and second fastener members respectively arranged to engage the first terminal end and the second terminal end and the first and second seal members; and a stray current collector system for collecting stray currents within the heater housing and including a terminal system configured for a grounding connection for conducting the stray currents to ground.

2. The heater assembly of claim 1, wherein the heater structure is fabricated of a non-metallic material.

3. The heater assembly of claim 1, wherein the stray current collector system comprises first and second current collector structures disposed at or adjacent opposed ends of the heater chamber, each having a collector terminal end configured for connection to the terminal system.

4. The heater assembly of claim 1, wherein:

the elongated member has first and second opposed end surfaces, and wherein said first and second ports are formed respectively in the first and second end surfaces.

5. The heater assembly of claim 1, wherein the seal member is an o-ring, and the cover plate and peripheral flange portion are configured to provide a radial seal force on the o-ring in an assembled condition.

6. The heater assembly of claim 1, wherein the first and second seal surfaces are formed by first and second recesses formed in said non-wetted surface of said plate.

7. The heater assembly of claim 6, wherein the first and second recesses have respective first and second threaded portions, and wherein said first and second fasteners are arranged to threadingly engage the respective first and second portions of said recesses, each of the first and second fasteners having an opening formed therein to allow the respective first and second terminal ends to pass therethough, and wherein the first and second fasteners compress the first and second seal members in the respective first and second recesses against the first and second terminal ends to provide a liquid seal.

8. The heater assembly of claim 1, further comprising an adapter structure for directly connecting a port of a pump to one of said first or second ports of the housing structure.

9. The heater assembly of claim 1, further comprising a tailpiece member adapted for engagement with said first or second port of said housing structure, said tailpiece member including a reduced diameter tailpiece port and a set of registration features allowing the tailpiece member to be engaged to said first or second port at any one of a plurality of radial positions.

10. The heater assembly of claim 1, further comprising a first sensor port formed in said housing structure adjacent and in fluid communication with a first end of the heater chamber, and a second sensor port formed in said housing structure adjacent and in fluid communication with a second end of the heater chamber.

11. The heater assembly of claim 10, further comprising a first temperature sensor disposed in said first sensor port and a second temperature sensor disposed in said second sensor port.

12. A heater assembly for a bathing installation including a water flow path and a pump for pumping water through the water flow path, comprising:

a heater housing structure defining an elongated heater chamber having a first port and a second port and defining a wetted side on the interior of the heater chamber and a non-wetted side on the exterior of the heater chamber;

a resistive heater element, including a coil portion having a diameter smaller than an inner dimension of the heater chamber and a first terminal end and a second terminal end, the heater element being free of any brazed or welded bulkhead members;

the housing structure including a first heater terminal opening and a second heater terminal opening, the first terminal end of the heater element passed through the first terminal opening from the wetted side to the non-wetted side, and the second terminal end of the heater element passed through the second terminal opening from the wetted side to the non-wetted side;

first and second seal members disposed on said non-wetted side respectively onto the first terminal end and the second terminal end and in contact with respective first and second seal surfaces defined on the housing structure;

first and second fastener members respectively arranged to engage the first terminal end and the second terminal end and the first and second seal members; and first and second current collector structures disposed at or adjacent opposed ends of the heater chamber, each having a collector terminal end, each collector structure free of any brazed or welded bulkhead members.

13. The heater assembly of claim 12, wherein the housing structure further includes including a third terminal opening and a fourth terminal opening, the collector terminal end of the first collector structure passed through the third terminal opening from the wetted side to the non-wetted side, and the collector terminal end of the second collector structure passed through the fourth terminal opening from the wetted side to the non-wetted side;

third and fourth seal members disposed on said non-wetted side respectively onto the collector terminal end of the first collector structure and the collector terminal end of the second collector structure and in contact with respective third and fourth seal surfaces defined on the housing structure;

third and fourth fastener members respectively arranged to engage the collector terminal end of the first current collector structure and the collector terminal end of the second current collector and the third and fourth seal members.

14. The heater assembly of claim 12, wherein said first and second current collector structures each comprise:

a unitary wire-form structure having a wire coil portion and a terminal end portion, and wherein the terminal end portion is passed through a collector terminal opening formed in the housing structure.

15. The heater assembly of claim 14, wherein the first and second ports include generally tubular portions, and the respective coil portions of the first and second current collector structures are disposed in the respective tubular portions of the first and second ports.

16. The heater assembly of claim 14, wherein the respective coil portions have a nominal coil diameter slightly larger than a diameter of the generally tubular portion.

17. The heater assembly of claim 15, wherein the respective coil portions have a generally cylindrical configuration.

18. The heater assembly of claim 15, wherein the respective tubular portions of the first and second ports includes a stop shoulder region to register a position of the current collector coil portion.

19. The heater assembly of claim 12, further comprising a grounding conductor strap connecting the respective collector terminal ends.

20. A heater assembly for a bathing installation including a water flow path and a pump for pumping water through the water flow path, comprising:

a heater housing structure defining an elongated heater chamber having a first port and a second port and defining a wetted side on the interior of the heater chamber and a non-wetted side on the exterior of the heater chamber;

a resistive heater element, including a coil portion having a diameter smaller than an inner dimension of the heater chamber and a first terminal end and a second terminal end, the heater element being free of any brazed or welded bulkhead members;

the housing structure including a first heater terminal opening and a second heater terminal opening, the first terminal end of the heater element passed through the first terminal opening from the wetted side to the non-wetted side, and the second terminal end of the heater element passed through the second terminal opening from the wetted side to the non-wetted side;

first and second seal members disposed on said non-wetted side respectively onto the first terminal end and the second terminal end and in contact with respective first and second seal surfaces defined on the housing structure;

first and second fastener members respectively arranged to engage the first terminal end and the second terminal end and the first and second seal members;

a first sensor port formed in said housing structure adjacent and in fluid communication with a first end of the heater chamber, and a second sensor port formed in said housing structure adjacent and in fluid communication with a second end of the heater chamber;

a first temperature sensor disposed in said first sensor port and a second temperature sensor disposed in said second sensor port;

wherein each said first and second temperature sensor comprises a solid state sensor element mounted to a circuit board, and an over-molded plastic housing structure in which the sensor element and circuit board are encapsulated.

21. A heater assembly for a bathing installation including a water flow path and a pump for pumping water through the water flow path, comprising:

a heater housing structure defining an elongated heater chamber having a first port and a second port and defining a wetted side on the interior of the heater chamber and a non-wetted side on the exterior of the heater chamber;

a resistive heater element, including a coil portion having a diameter smaller than an inner dimension of the heater chamber and a first terminal end and a second terminal end, the heater element being free of any brazed or welded bulkhead members;

the housing structure including a first heater terminal opening and a second heater terminal opening, the first terminal end of the heater element passed through the first terminal opening from the wetted side to the non-wetted side, and the second terminal end of the heater element passed through the second terminal opening from the wetted side to the non-wetted side;

first and second seal members disposed on said non-wetted side respectively onto the first terminal end and the second terminal end and in contact with respective first and second seal surfaces defined on the housing structure;

first and second fastener members respectively arranged to engage the first terminal end and the second terminal end and the first and second seal members; and a plurality of stabilizer brackets positioned between said coil portion of said heating element and adjacent wetted surfaces of said heater chamber to secure the heating element in position against forces applied by water moving through the heating chamber at high velocity.

22. A heater assembly for a bathing installation including a water flow path and a pump for pumping water through the water flow path, comprising:

a heater housing structure defining an elongated heater chamber having a first Port and a second port and defining a wetted side on the interior of the heater chamber and a non-wetted side on the exterior of the heater chamber;

a resistive heater element, including a coil portion having a diameter smaller than an inner dimension of the heater chamber and a first terminal end and a second terminal end, the heater element being free of any brazed or welded bulkhead members;

the housing structure including a first heater terminal opening and a second heater terminal opening, the first terminal end of the heater element passed through the first terminal opening from the wetted side to the non-wetted side, and the second terminal end of the heater element passed through the second terminal opening from the wetted side to the non-wetted side;

first and second seal members disposed on said non-wetted side respectively onto the first terminal end and the second terminal end and in contact with respective first and second seal surfaces defined on the housing structure;

first and second fastener members respectively arranged to engage the first terminal end and the second terminal end and the first and second seal members; and a tailpiece adapter system configured to attach to said first heater port, including a threaded nut configured to engage threads formed on said first heater port, and an adapter member having a distal threaded end portion configured to engage threads on a bathing system part, and a flange end portion configured to engage the nut so that the nut secures the adapter member to the first port in a tightened position.

23. The heater assembly of claim 22, wherein the bathing system part is a pump.

24. A heater assembly for a bathing installation including a water flow path and a pump for pumping water through the water flow path, comprising:

a heater housing structure defining an elongated heater chamber having a first port and a second port and defining a wetted side on the interior of the heater chamber and a non-wetted side on the exterior of the heater chamber;

a resistive heater element, including a coil portion having a diameter smaller than an inner dimension of the heater chamber and a first terminal end and a second terminal end, the heater element being free of any brazed or welded bulkhead members;

the housing structure including a first heater terminal opening and a second heater terminal opening, the first terminal end of the heater element passed through the first terminal opening from the wetted side to the non-wetted side, and the second terminal end of the heater element passed through the second terminal opening from the wetted side to the non-wetted side;

first and second seal members disposed on said non-wetted side respectively onto the first terminal end and the second terminal end and in contact with respective first and second seal surfaces defined on the housing structure;

first and second fastener members respectively arranged to engage the first terminal end and the second terminal end and the first and second seal members; and a tailpiece adapter system configured to attach to said first heater port, including a threaded nut configured to engage threads formed on said first heater port, and an adapter fitting including a cover plate surface for covering a portion of the port opening, and a tubular port portion extending from the surface about an opening to perform a port opening size reducing function, and the fitting is adapted to be fitted to said first heater port at any one of a plurality of radial positions to allow the opening to be positioned to mitigate air trapping in the heater cavity.

25. A heater assembly for a bathing installation including a recirculating water flow path and a pump for pumping water through the water flow path, comprising:

a heater housing structure defining an elongated heater chamber having a first port and a second port and defining a wetted side on the interior of the heater chamber and a non-wetted side on the exterior of the heater chamber, the housing structure including a generally trough shaped elongated member defining an open trough region and said first and second ports are formed respectively at opposite ends of the trough region, the trough shaped member having an open top region circumscribed by a peripheral flange portion, and a cover plate configured for attached to said peripheral flange portion and having a wetted surface facing the trough region and a non-wetted surface on an opposed side of the plate, the elongated member and the cover plate each fabricated of an electrically non-conductive plastic material;

a resistive heater element, including a first terminal end and a second terminal end, the heater element being free of any brazed or welded bulkhead members;

the cover plate including a first heater terminal opening and a second heater terminal opening, the first terminal end of the heater element passed through the first terminal opening from the wetted side to the non-wetted side, and the second terminal end of the heater element passed through the second terminal opening from the wetted side to the non-wetted side;

first and second seal members disposed on said non-wetted side respectively onto the first terminal end and the second terminal end and in contact with respective first and second seal surfaces defined on the housing structure;

first and second fastener members respectively arranged to engage the first terminal end and the second terminal end and the first and second seal members; and a stray current collector system for collecting stray currents within the heater housing and including a terminal system configured for a grounding connection to conduct the stray currents to ground.

26. The heater assembly of claim 25, further comprising an elastomeric seal member configured to provide a fluid seal between the elongated member and the cover plate, and the cover plate and peripheral flange portion are configured to provide a radial seal force on the seal member in an assembled condition.

27. A heater assembly for a bathing installation including a recirculating water flow path and a pump for pumping water through the water flow path, comprising:

an electrically non-conductive, plastic heater housing structure defining an elongated heater chamber having a first port and a second port and defining a wetted side on the interior of the heater chamber and a non-wetted side on the exterior of the heater chamber, the housing structure including a generally trough shaped elongated member defining an open trough region and said first and second ports are formed respectively at opposite ends of the trough region, the trough shaped member having an open top region circumscribed by a peripheral flange portion, and a cover plate configured for attached to said peripheral flange portion and having a wetted surface facing the trough region and a non-wetted surface on an opposed side of the plate;

a resistive heater element, including a first terminal end and a second terminal end, the heater element being free of any brazed or welded bulkhead members;

the cover plate including a first heater terminal opening and a second heater terminal opening, the first terminal end of the heater element passed through the first terminal opening from the wetted side to the non-wetted side, and the second terminal end of the heater element passed through the second terminal opening from the wetted side to the non-wetted side;

first and second seal members disposed on said non-wetted side respectively onto the first terminal end and the second terminal end and in contact with respective first and second seal surfaces defined on the housing structure;

first and second fastener members respectively arranged to engage the first terminal end and the second terminal end and the first and second seal members; and first and second current collector structures disposed at or adjacent opposed ends of the heater chamber, each having a collector terminal end, each collector structure free of any brazed or welded bulkhead members.

28. The heater assembly of claim 27, wherein the housing structure further includes including a third terminal opening and a fourth terminal opening, the collector terminal end of the first collector structure passed through the third terminal opening from the wetted side to the non-wetted side, and the collector terminal end of the second collector structure passed through the fourth terminal opening from the wetted side to the non-wetted side;

third and fourth seal members disposed on said non-wetted side respectively onto the collector terminal end of the first collector structure and the collector terminal end of the second collector structure and in contact with respective third and fourth seal surfaces defined on the housing structure;

third and fourth fastener members respectively arranged to engage the collector terminal end of the first current collector structure and the collector terminal end of the second current collector and the third and fourth seal members.

29. The heater assembly of claim 27, wherein said first and second current collector structures each comprise:

a unitary wire-form structure having a wire coil portion and a terminal end portion, and wherein the terminal end portion is passed through a collector terminal opening formed in the housing structure.

30. The heater assembly of claim 29, wherein the first and second ports include generally tubular portions, and the respective coil portions of the first and second current collector structures are disposed in the respective tubular portions of the first and second ports.

31. A heater assembly for a bathing installation including a recirculating water flow path and a pump for pumping water through the water flow path, comprising:

an electrically non-conductive, plastic heater housing structure defining an elongated heater chamber having a first port and a second port and defining a wetted side on the interior of the heater chamber and a non-wetted side on the exterior of the heater chamber, the housing structure including a generally trough shaped elongated member defining an open trough region and said first and second ports are formed respectively at opposite ends of the trough region, the trough shaped member having an open top region circumscribed by a peripheral flange portion, and a cover plate configured for attached to said peripheral flange portion and having a wetted surface facing the trough region and a non-wetted surface on an opposed side of the plate;

a resistive heater element, including a first terminal end and a second terminal end, the heater element being free of any brazed or welded bulkhead members;

the cover plate including a first heater terminal opening and a second heater terminal opening, the first terminal end of the heater element passed through the first terminal opening from the wetted side to the non-wetted side, and the second terminal end of the heater element passed through the second terminal opening from the wetted side to the non-wetted side;

first and second seal members disposed on said non-wetted side respectively onto the first terminal end and the second terminal end and in contact with respective first and second seal surfaces defined on the housing structure;

first and second fastener members respectively arranged to engage the first terminal end and the second terminal end and the first and second seal members;

an elastomeric seal member configured to provide a fluid seal between the elongated member and the cover plate, and the cover plate and peripheral flange portion are configured to provide a radial seal force on the seal member in an assembled condition; and wherein the cover plate includes a plurality of protruding peripheral tab members each configured to be received within a corresponding slot formed in said peripheral flange portion of the elongated member, the tab members resisting forces tending to press outwardly wall portions of the elongated member and to cause the fluid seal to leak.

32. A heater assembly for a bathing installation, comprising:

an electrically non-conductive, plastic heater housing structure defining an elongated heater chamber having a first port and a second port and defining a wetted side on the interior of the heater chamber and a non-wetted side on the exterior of the heater chamber, the housing structure including a generally trough shaped elongated member defining an open trough region, said first and second ports are formed respectively at opposite ends of the trough region, the trough shaped member having an open top region circumscribed by a peripheral flange portion, a cover plate configured for attached to said peripheral flange portion and having a wetted surface facing the trough region and a non-wetted surface on an opposed side of the plate, and an elastomeric seal member configured to provide a fluid seal between the trough member and the cover plate;

a resistive heater element, including a first terminal end and a second terminal end, the heater element being free of any brazed or welded bulkhead members;

the housing structure including a first heater terminal opening and a second heater terminal opening, the first terminal end of the heater element passed through the first terminal opening from a wetted side to a non-wetted side, and the second terminal end of the heater element passed through the second terminal opening from the wetted side to the non-wetted side;

first and second seal members disposed respectively onto the first terminal end and the second terminal end and in contact with respective first and second seal surfaces defined on the housing structure;

first and second fastener members respectively arranged to engage the first terminal end and the second terminal end and the first and second seal members first and second current collector structures disposed at or adjacent opposed ends of the heater chamber, each having a collector terminal end, each collector structure free of any brazed or welded bulkhead members.

33. The heater assembly of claim 32, wherein the housing structure further includes including a third terminal opening and a fourth terminal opening, the collector terminal end of the first collector structure passed through the third terminal opening from the wetted side to the non-wetted side, and the collector terminal end of the second collector structure passed through the fourth terminal opening from the wetted side to the non-wetted side;

third and fourth seal members disposed respectively onto the collector terminal end of the first collector structure and the collector terminal end of the second collector structure and in contact with respective third and fourth seal surfaces defined on the housing structure;

third and fourth fastener members respectively arranged to engage the collector terminal end of the first current collector structure and the collector terminal end of the second current collector and the third and fourth seal members.

34. The heater assembly of claim 32, wherein said first and second current collector structures each comprise:

a unitary wire-form structure having a wire coil portion and a terminal end portion, and wherein the terminal end portion is passed through a collector terminal opening formed in the housing structure.

35. The heater assembly of claim 34, wherein the first and second ports include generally tubular portions, and the respective coil portions of the first and second current collector structures are disposed in the respective tubular portions of the first and second ports.

36. The heater assembly of claim 32, wherein the cover plate includes a plurality of protruding peripheral tab members each configured to be received within a corresponding slot formed in said peripheral flange portion of the elongated member, the tab members resisting forces tending to press outwardly wall portions of the elongated member and to cause the fluid seal to leak.

* * * * *